Patented Oct. 11, 1949

2,484,634

UNITED STATES PATENT OFFICE 2,484,634

METHYL OXYFOLIC ACID

Gustav J. Martin and Harold Urist, Philadelphia, Pa., assignors to The National Drug Company, Philadelphia, Pa., a corporation of Pennsylvania No Drawing. Application February 21, 1948, Serial No. 10,198

3 Claims. (Cl. 260—251)

Our present invention relates to new chemotherapeutic agents and to a process of preparing the same. More particularly, it is concerned with the novel compounds, methyl oxyfolic acid and its salts.

The methyl oxyfolic acid is more precisely defined by the name, N-[4-({(2,4 - dihydroxy - 7-methyl-6 - pteridyl) methyl}amino) benzoyl] glutamic acid and possesses the following structural formula:

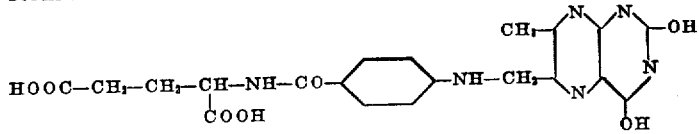

It is a brown powder, insoluble in water and readily soluble in dilute aqueous solutions of caustic alkalies, wherein it forms alkali metal salts. Other salts of this acid may readily be obtained in a conventional manner by neutralizing it with suitable bases.

We have found that the methyl oxyfolic acid and its salts possess valuable pharmacological properties. In particular they are highly effective bacteriostatic agents, especially in preventing the growth of pathogenic bacteria. Their action in this respect appears to be due to their ability to displace folic acid, a member of the vitamin B complex. Our new chemotherapeutic agents may be administered orally, injected intravenously or incorporated in an ointment and applied externally.

We have succeeded in preparing the methyl oxyfolic acid by condensing para-amino-benzoyl glutamic acid, crotonaldehyde dibromide, and 5,6-diaminouracil or its salts. Such condensation is preferably effected in a buffered aqueous solution at room temperature. All three reaction materials may be condensed simultaneously or the condensation may be carried out in two stages without isolation of the intermediate condensation product. Either the dextro- or levo rotatory forms of the para-amino-benzoyl glutamic acid or mixtures thereof may be employed. In place of the free 5,6-diminouracil, one may likewise use its salts, such as the bisulfate, sulfite and bisulfite. Approximately equimolecular amounts of the reaction materials are generally employed, although in some cases it may be advantageous to employ an excess of the crotonaldehyde dibromide and/or the 5,6-diaminouracil.

The water-insoluble, crude reaction product may be purified by refluxing it with methanol, collecting it by filtration, dissolving it in a dilute, aqueous, caustic alkali solution, filtering said solution to remove impurities, and then precipitating the free acid from the filtrate by the addition of a dilute mineral acid. The refluxing with methanol may be dispensed with, particularly when an excess of the crotonaldehyde dibromide and/or the 5,6-diaminouracil is employed.

Our process may be better understood by consideration of the following illustrative example. Obviously, our invention is not limited to the specific reactants, proportions and reaction conditions set forth therein, as such details may be varied without departing from the spirit and scope hereof.

Example

A buffered aqueous solution was prepared by forming a mixture of 66.9 grams of anhydrous sodium acetate with 54.5 grams of glacial acetic acid and then diluting the mixture with water to form one liter of solution.

To 1200 cc. of a buffered aqueous solution, prepared as described above, there were added at room temperature 53.2 grams (0.2 mole) of para-amino-benzoyl glutamic acid, 46 grams (0.2 mole) of crotonaldehyde dibromide, and 67.2 grams (0.2 mole) of 5,6-diaminouracil bisulfate. The mixture was then stirred for five hours at room temperature and allowed to stand overnight.

On the following morning the brown precipitate which had formed was filtered out and dried in the air. This crude reaction product was refluxed with methanol, collected by filtration, washed with methanol, and again dried in the air. It was thereupon further purified by dissolving it in a dilute aqueous solution of sodium hydroxide, filtering the solution to remove impurities, and precipitating the free acid from the filtrate by the addition of dilute hydrochloric acid. This precipitate was collected by filtration and, when dried in air, weighed 3.5 grams. It was a brown powder of indeterminate melting point, and was composed of the desired methyl oxyfolic acid of the structural formula previously set forth herein. It was readily converted to its salts by neutralization with suitable bases.

We claim:

1. A compound selected from the group consisting of N-[4-({(2,4-dihydroxy - 7 - methyl-6- pteridyl)methyl}amino) benzoyl] glutamic acid of the structural formula
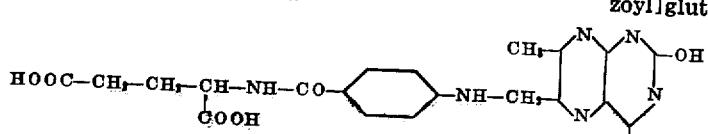
and alkali metal salts thereof.
2. N-[4-({(2,4-dihydroxy-7-methyl-6 - pteridyl)methyl}amino) benzoyl]glutamic acid.
3. The alkali metal salts of N-[4-({(2,4-dihydroxy - 7 - methyl-6-pteridyl)methyl}amino)benzoyl]glutamic acid.
GUSTAV J. MARTIN.
HAROLD URIST.
No references cited.